United States Patent
Voutta et al.

(10) Patent No.: US 10,353,564 B2
(45) Date of Patent: Jul. 16, 2019

(54) GRAPHICAL USER INTERFACE WITH VIRTUAL EXTENSION AREAS

(71) Applicant: SAP SE, Walldorf (DE)

(72) Inventors: Emil Voutta, Heidelberg (DE); Florian Jann, Heidelberg (DE); Michael Krenkler, Wiesloch (DE)

(73) Assignee: SAP SE, Walldorf (DE)

( * ) Notice: Subject to any disclaimer, the term of this patent is extended or adjusted under 35 U.S.C. 154(b) by 265 days.

(21) Appl. No.: 14/976,187

(22) Filed: Dec. 21, 2015

(65) Prior Publication Data

US 2017/0177185 A1    Jun. 22, 2017

(51) Int. Cl.
| | |
|---|---|
| *G06F 3/0485* | (2013.01) |
| *G06F 3/0481* | (2013.01) |
| *G06F 3/0482* | (2013.01) |
| *G06F 3/0484* | (2013.01) |
| *G06F 3/0488* | (2013.01) |
| *G09G 5/00* | (2006.01) |
| *G06F 9/451* | (2018.01) |
| *H04M 1/725* | (2006.01) |

(52) U.S. Cl.
CPC .......... *G06F 3/0485* (2013.01); *G06F 3/0482* (2013.01); *G06F 3/04817* (2013.01); *G06F 3/04845* (2013.01); *G06F 3/04883* (2013.01); *G06F 3/04886* (2013.01); *G06F 9/451* (2018.02); *G09G 5/005* (2013.01); *H04M 1/72583* (2013.01)

(58) Field of Classification Search
CPC .. G06F 3/0485; G06F 3/04817; G06F 3/0482; G06F 3/04845; G06F 3/04883; G09G 5/005
See application file for complete search history.

(56) References Cited

U.S. PATENT DOCUMENTS

| | | | |
|---|---|---|---|
| 5,517,663 | A | 5/1996 | Kahn |
| 5,657,462 | A | 8/1997 | Brouwer |
| 5,682,469 | A | 10/1997 | Linnett |
| 5,727,950 | A | 3/1998 | Cook |
| 5,754,174 | A | 5/1998 | Carpenter |
| 5,867,156 | A | 2/1999 | Beard et al. |
| 5,877,759 | A | 3/1999 | Bauer |

(Continued)

FOREIGN PATENT DOCUMENTS

| | | |
|---|---|---|
| EP | 2076000 A2 | 7/2009 |
| EP | 2178283 A1 | 4/2010 |
| WO | WO 2010/110614 A2 | 9/2010 |

OTHER PUBLICATIONS

Extended European Search Report or European Application No. 6002476.6, dated May 17, 2017, 8 pages.

*Primary Examiner* — Mandrita Brahmachari

(74) *Attorney, Agent, or Firm* — Sterne, Kessler, Goldstein & Fox P.L.L.C.

(57) ABSTRACT

A device and a method for generating a graphical user interface on a display area involve displaying main content in an initial location on the display area. Supplemental content is assigned to a virtual extension area and include a fixed set of user interface elements. Responsive to a request to switch from the main content to the supplemental content, the main content is shifted away from the virtual extension area together with shifting the supplemental content from the virtual extension area onto the display area.

19 Claims, 11 Drawing Sheets

(56) References Cited

U.S. PATENT DOCUMENTS

| | | |
|---|---|---|
| 6,025,841 A | 2/2000 | Finkelstein |
| 6,085,184 A | 7/2000 | Bertrand |
| 6,262,730 B1 | 7/2001 | Horvitz |
| 6,333,973 B1 * | 12/2001 | Smith ................. H04M 1/576 379/67.1 |
| 6,735,632 B1 | 5/2004 | Kiraly |
| 6,751,606 B1 | 6/2004 | Fries |
| 6,788,313 B1 | 9/2004 | Heil |
| 6,806,892 B1 | 10/2004 | Plow et al. |
| 6,845,486 B2 | 1/2005 | Yamada |
| 6,892,349 B2 | 5/2005 | Shizuka |
| 7,441,190 B2 | 10/2008 | Asami |
| 7,636,045 B2 | 12/2009 | Sugiyama |
| 7,797,146 B2 | 9/2010 | Harless |
| 7,797,338 B2 | 9/2010 | Feng |
| 7,933,399 B2 | 4/2011 | Knott |
| 7,966,269 B2 | 6/2011 | Bauer |
| 8,225,231 B2 | 7/2012 | Zielinski |
| 8,978,010 B1 | 3/2015 | Thumfart et al. |
| 9,176,801 B2 | 11/2015 | Baeuerle et al. |
| 9,202,171 B2 | 12/2015 | Kuhn |
| 9,223,549 B1 | 12/2015 | Hermanns et al. |
| 9,703,458 B2 | 7/2017 | Sasaki |
| 9,740,462 B2 | 8/2017 | Rao et al. |
| 9,807,145 B2 | 10/2017 | Koon |
| 2002/0005865 A1 | 1/2002 | Hayes-Roth |
| 2002/0149611 A1 | 10/2002 | May |
| 2003/0020671 A1 | 1/2003 | Santoro |
| 2003/0028498 A1 | 2/2003 | Hayes-Roth |
| 2004/0056878 A1 | 3/2004 | Lau |
| 2004/0075677 A1 | 4/2004 | Loyall |
| 2004/0179659 A1 | 9/2004 | Byrne |
| 2005/0039127 A1 | 2/2005 | Davis |
| 2006/0041848 A1 | 2/2006 | Lira |
| 2006/0136223 A1 | 6/2006 | Brun |
| 2006/0253791 A1 | 11/2006 | Kuiken et al. |
| 2006/0271398 A1 | 11/2006 | Belcastro |
| 2007/0061755 A1 * | 3/2007 | Taboada ................. G06F 3/0481 715/818 |
| 2007/0083821 A1 | 4/2007 | Garbow et al. |
| 2008/0096533 A1 | 4/2008 | Manfredi |
| 2008/0155409 A1 | 6/2008 | Santana |
| 2009/0132956 A1 * | 5/2009 | Mahasintunan ...... G06F 3/0485 715/784 |
| 2009/0153335 A1 | 6/2009 | Birtcher |
| 2009/0248695 A1 | 10/2009 | Ozzie |
| 2011/0099524 A1 * | 4/2011 | Jeong ................. G06F 3/04886 715/843 |
| 2011/0115817 A1 | 5/2011 | Chun |
| 2011/0283215 A1 | 11/2011 | Dunn |
| 2012/0032955 A1 * | 2/2012 | Matsuda ............. G06F 3/04815 345/419 |
| 2012/0079429 A1 * | 3/2012 | Stathacopoulos ........................... G06F 17/30979 715/830 |
| 2012/0179978 A1 * | 7/2012 | Klassen ............. G06F 3/04817 715/752 |
| 2012/0216125 A1 | 8/2012 | Pierce |
| 2012/0253788 A1 | 10/2012 | Heck |
| 2012/0254227 A1 | 10/2012 | Heck |
| 2012/0265528 A1 | 10/2012 | Gruber |
| 2013/0067366 A1 * | 3/2013 | Almosnino ........... G06F 3/0483 715/764 |
| 2013/0117667 A1 * | 5/2013 | Pallakoff ................. G06Q 50/01 715/273 |
| 2013/0152017 A1 | 6/2013 | Song |
| 2013/0174034 A1 | 7/2013 | Brown |
| 2013/0204813 A1 | 8/2013 | Master |
| 2014/0040748 A1 | 2/2014 | Lemay |
| 2014/0068459 A1 | 3/2014 | Graham |
| 2014/0074483 A1 | 3/2014 | Van Os |
| 2014/0164963 A1 | 6/2014 | Klemenz et al. |
| 2014/0337770 A1 | 11/2014 | Sasaki |
| 2014/0344024 A1 | 11/2014 | Kempf |
| 2015/0006135 A1 | 1/2015 | Deb et al. |
| 2015/0040104 A1 | 2/2015 | Mall |
| 2015/0074069 A1 | 3/2015 | Baeuerle et al. |
| 2015/0089373 A1 | 3/2015 | Dwivedi et al. |
| 2015/0089403 A1 | 3/2015 | Zhu et al. |
| 2015/0123993 A1 | 5/2015 | Ohba et al. |
| 2015/0161180 A1 | 6/2015 | Hermanns et al. |
| 2015/0186156 A1 | 7/2015 | Brown |
| 2015/0195406 A1 | 7/2015 | Dwyer |
| 2015/0339036 A1 | 11/2015 | Hwang |
| 2015/0382047 A1 | 12/2015 | Van Os |
| 2016/0041702 A1 * | 2/2016 | Wang ................. G06F 3/0482 715/830 |
| 2016/0062745 A1 | 3/2016 | Rao |
| 2016/0070580 A1 | 3/2016 | Johnson |
| 2016/0094497 A1 | 3/2016 | Javed |
| 2017/0177650 A1 | 6/2017 | Devine |
| 2017/0244959 A1 | 8/2017 | Ranjeet et al. |
| 2017/0329466 A1 | 11/2017 | Krenkler et al. |
| 2017/0329468 A1 | 11/2017 | Schon et al. |
| 2017/0329479 A1 | 11/2017 | Rauschenbach et al. |
| 2017/0329483 A1 | 11/2017 | Jann et al. |
| 2017/0329499 A1 | 11/2017 | Rauschenbach et al. |
| 2017/0329500 A1 | 11/2017 | Grammaikakis et al. |
| 2017/0329505 A1 | 11/2017 | Richter et al. |
| 2017/0329580 A1 | 11/2017 | Jann et al. |
| 2017/0329581 A1 | 11/2017 | Jann et al. |
| 2017/0329614 A1 | 11/2017 | Schon et al. |
| 2017/0331915 A1 | 11/2017 | Jann et al. |
| 2017/0344218 A1 | 11/2017 | Jann et al. |
| 2017/0346949 A1 | 11/2017 | Sanghavi |

\* cited by examiner

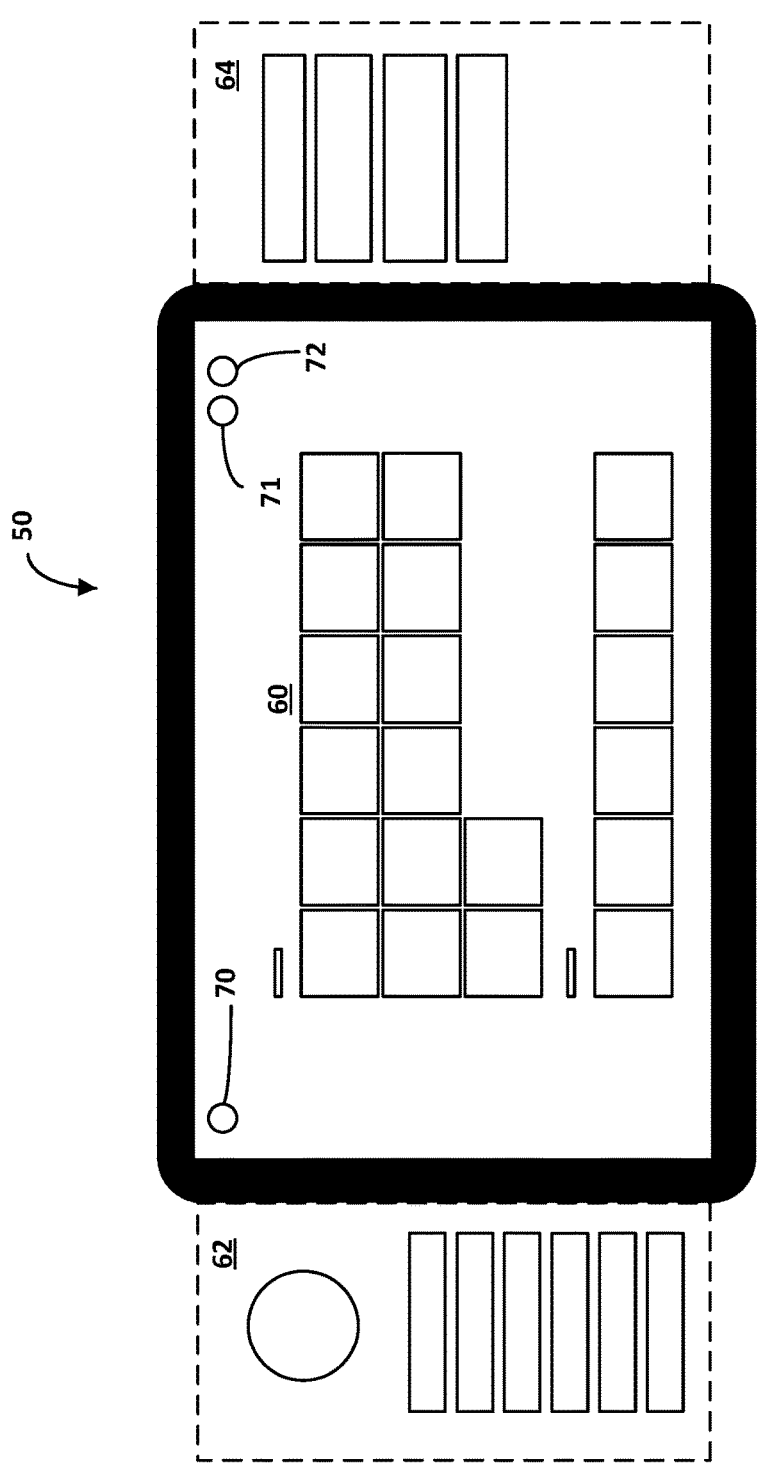

GRAPHICAL USER INTERFACE WITH VIRTUAL EXTENSION AREAS

BACKGROUND INFORMATION

Users of software applications designed to support business processes often need to access a set of functions and information from multiple screens of a graphical user interface (GUI), no matter where inside the application the user is located and without having to leave a current context. Examples of such information or functions are: Title, Navigation, Notifications, Settings, Help, Logout, Profile, Link to Start Screen, Search, and generally available Objects and Tools.

Conventionally, access is provided by sacrificing display space to form a so-called "shell," usually located at the top or bottom of the display area. The space taken up by the shell would be better used for displaying content of the application. As more and more functions and information need to be accessible, these shells can become very crowded or nested, especially where users expect to have access to the same functionality across multiple devices (on their mobile devices as well as their desktop computer, for example). Often, the space on a display of a desktop computer is not used optimally because a compromise is made between desktop and mobile versions of the user interface in order to balance access versus ease of viewing.

BRIEF DESCRIPTION OF THE DRAWINGS

FIGS. 6A-6C show switching of content on a display device according to an example embodiment of the present disclosure.

DETAILED DESCRIPTION

Figure 1:
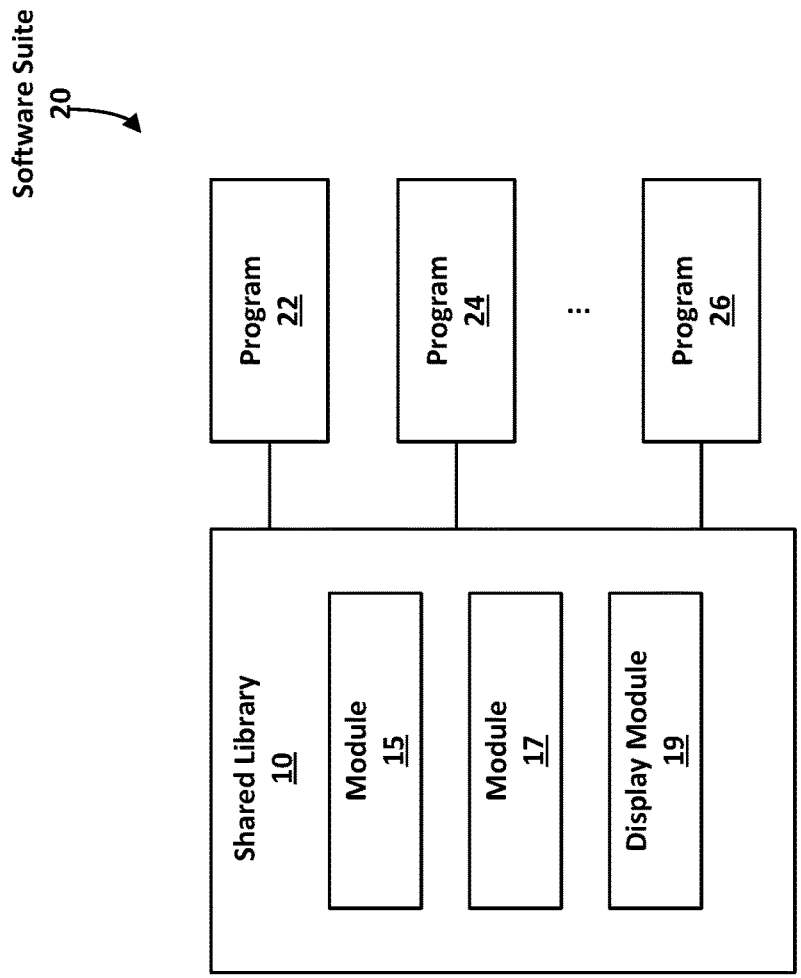
FIG. 1 is a block diagram of a system including a software program according to an example embodiment of the present disclosure.

The present disclosure relates to graphical user interfaces of software applications that display content, referred to herein as the "main content," together with functions and other information besides the main content, i.e., supplemental content. Such applications may comprise standalone software programs that include a built-in display module that generates a graphical user interface as described in the example embodiments herein. Alternatively, display functionality may be provided separately, e.g., as an add-on package, a plug-in or through a separate program that communicates with a main content providing program via an application program interface (API). The main content providing program and/or the display program may be executed locally on a user device and/or remotely, as a Web application, for example.

Aspects of the present disclosure are applicable to any number of display-enabled devices including, for example, any combination of one or more of, inter alia, a desktop computer, a laptop computer, a notebook, a tablet, a smartphone, a smartwatch, etc.

Example embodiments are described in which a display area, referred to herein as a "ViewPort," is switchable to display the main content at a different time than the above described functions and information. When the main content is selected for display, the ViewPort provides the user with a clear screen orientation, allowing the user to focus on his current task. Additionally, the ViewPort includes user selectable options to switch the display to the functions and information, thus ensuring access to everything the user may need in a convenient, space saving and visually appealing way. The options do not require much space to display, so that user interface can be made to look essentially the same across different computer devices. Thus, the ViewPort has a responsive design.

In an example embodiment, the functions and information are assigned to at least one virtual extension of the ViewPort. Preferably, the virtual extension includes a first extension area to the left of the ViewPort and a second extension area to the right of the ViewPort. When the main content is selected, the extension area(s) are hidden from display.

In an example embodiment, the ViewPort is switched to display selected supplemental content by triggering a graphical icon inside the ViewPort. Alternatively, if the display is touch-sensitive, the ViewPort may be switched by a touch gesture such as a swiping motion towards or away from the corresponding extension area. The ViewPort may be switched back to the main content, e.g., by triggering a respective icon or using a gesture.

In an example embodiment, trigger icons indicate when new or unread information is available inside a respective extension area. The indication can be a numerical counter, a symbol, a special graphic or animation, etc. Thus, the user need not leave the current context, i.e., the main content, to be alerted to new information.

In an example embodiment, the supplemental content is displayed by moving the corresponding extension area over to the ViewPort. Preferably, the movement is animated in the manner of a camera pan. However, other movements such as instantaneous display or fading in and out are also possible.

In an example embodiment, at least part of the main content remains on display in the ViewPort when the extension area is displayed. Preferably, the main content is shifted away from a central portion of the ViewPort and reduced in size (e.g., scaled down to 75% of its original size) to direct the user's attention to the supplemental content. In this display state, the main content may be partially cut off by the border of the ViewPort.

FIG. 1 is a block diagram of a system including a software program 20 according to an example embodiment of the present disclosure. The program 20 may comprise a suite of related software applications 22, 24 and 26 that provide functionality such as document creation, e-mail, instant messaging, inventory management, business account management, marketing, analytics, etc. The program 20 may further include a library 20 that contains instructions and/or data shared among the applications 22, 24, 26. Contents of the shared library 20 may include, for example, various software modules 15, 17 and 19 that provide generic or shared functions across multiple ones of the applications 22, 24, 26.

The module 19 is a display module that provides display functionality in accordance with the example embodiments described herein. The program 20 is executed by at least one user computer (not shown) in the system. For example, the program 20 may be executed at least partially as a client application on a local computer of a user, including as a Web application on a mobile phone or a desktop computer. The program 20 may also include server components that support the functionality of the client application. Any number of mechanisms (for example, APIs, communication protocols, etc.) may be employed to interconnect and coordinate the various components of the program 20, which components may be deployed at multiple user devices, backend servers, cloud computers, etc.

Figure 2:
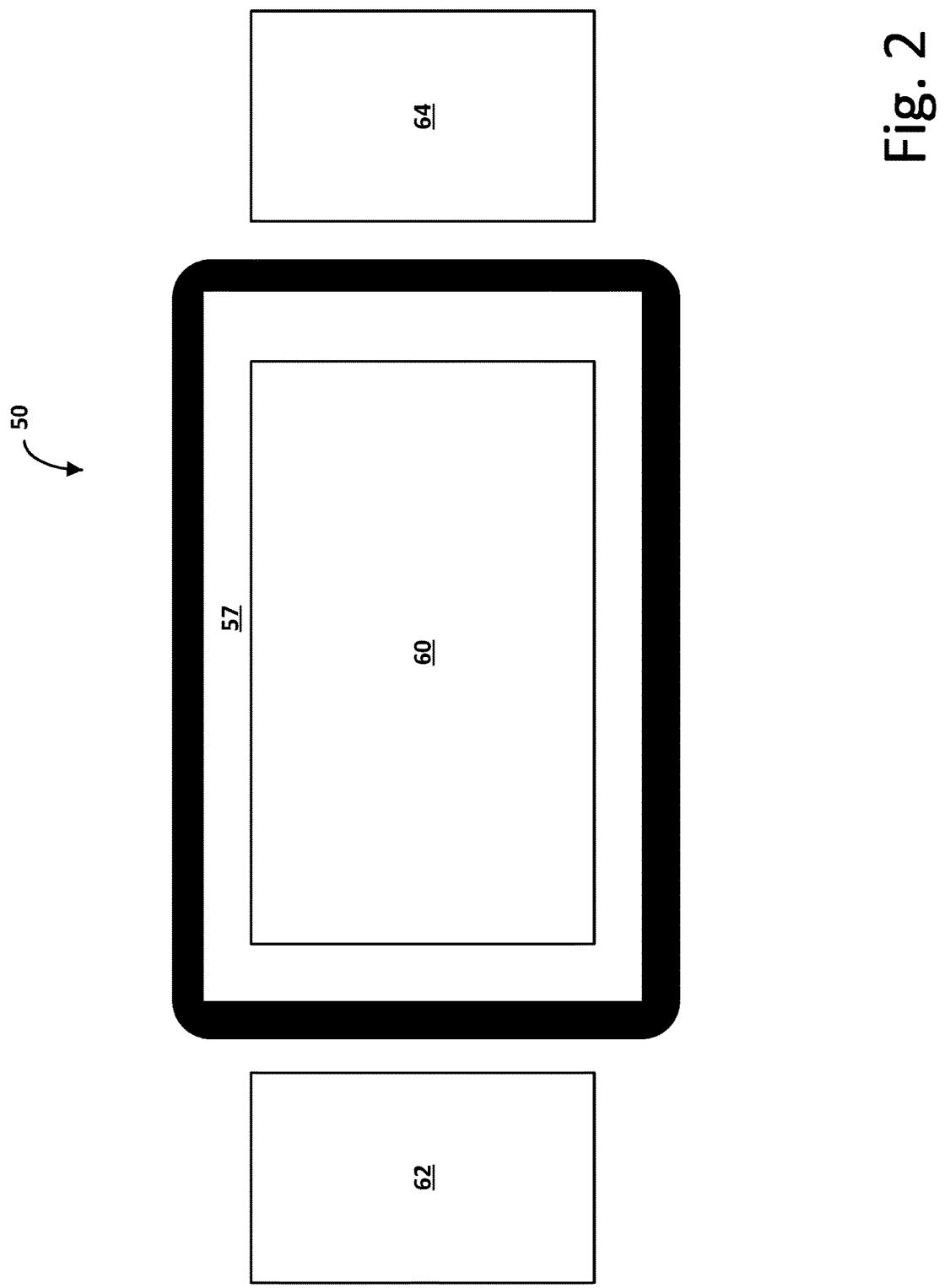
FIG. 2 shows a display device including content to be displayed on a GUI according to an example embodiment of the present disclosure.

FIG. 2 shows a display device 50 including content to be displayed on a GUI 57 according to an example embodiment of the present disclosure. The GUI 57 includes a display area that displays main content 60 generated by the program 20. The GUI 57 further includes virtual extension areas to the left and right of the display area. Other placements of the extension areas, such as along the top and bottom of the display area, are also possible.

Figure 3:
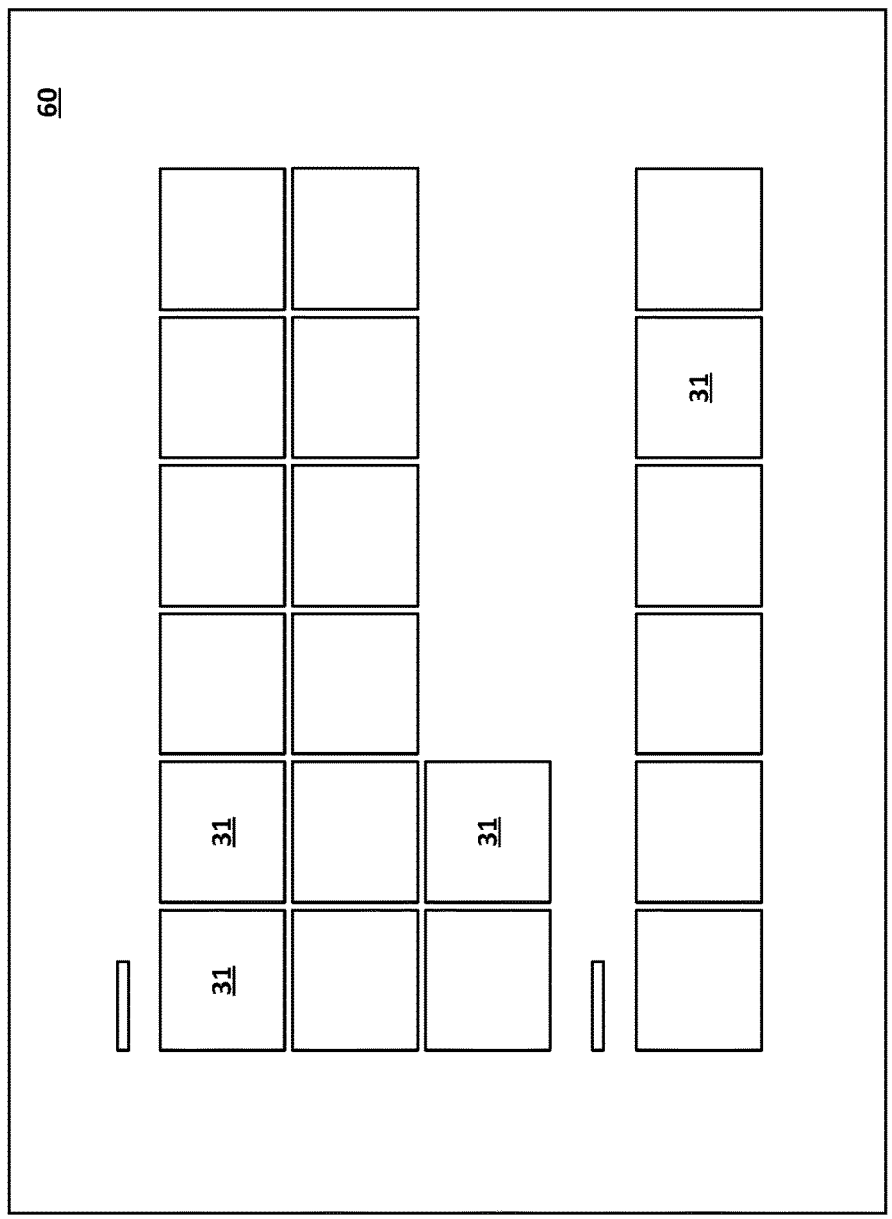
FIG. 3 shows main content to be displayed on a GUI according to an example embodiment of the present disclosure.

FIG. 3 shows an example embodiment of the main content 60, which may include text, images, a combination of text and images, etc. generated by the program 20. These elements may be arranged within tiles 31 that form a page of content. The tiles 31 may be viewed by scrolling, for example, in the vertical and/or horizontal directions. A scrollbar may be displayed for this purpose. Alternatively, scrolling may be performed by swiping on a touch-sensitive display.

Figure 4:
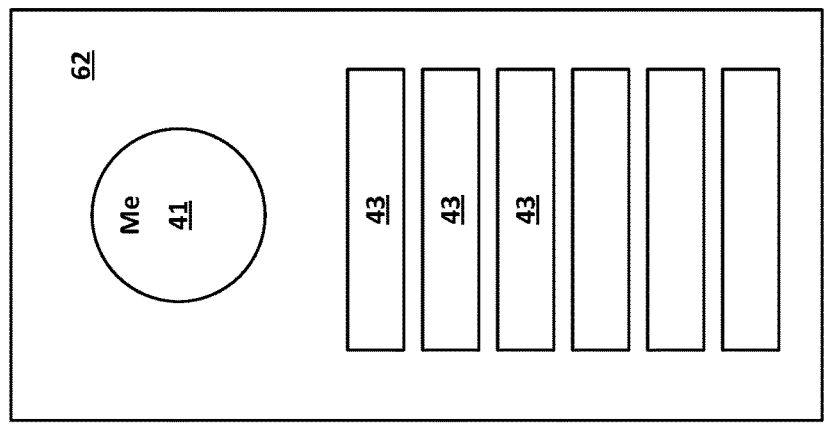

FIG. 4 shows an example embodiment of supplemental content 62 assigned to the left extension area, which in this example is a "Me" area containing functions and/or information relating to the individual user. Thus, the content 62 may include a photo or avatar image 41 associated with the user's profile. On triggering the image 41, additional user profile information may be displayed. The content 62 may further include a plurality of options 43 that trigger corresponding user-related settings such as Catalog, Edit, Contact Support, User Settings, Help, and Logout.

Figure 5:
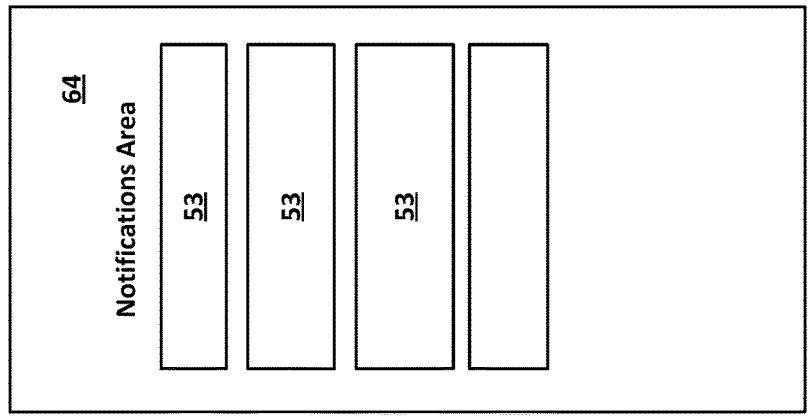
FIGS. 4 and 5 each show supplemental content to be displayed on a GUI according to an example embodiment of the present disclosure.

FIG. 5 shows an example embodiment of supplemental content 64 assigned to the right extension area, which in this example is a notifications area containing electronic messages collected from a variety of data sources such as an email server, a Web forum, an instant messaging service, Web sites the user has subscribed to, etc. The content 64 may include a separate button, icon, widget, etc. 53 for accessing different notification categories.

Figure 6B:
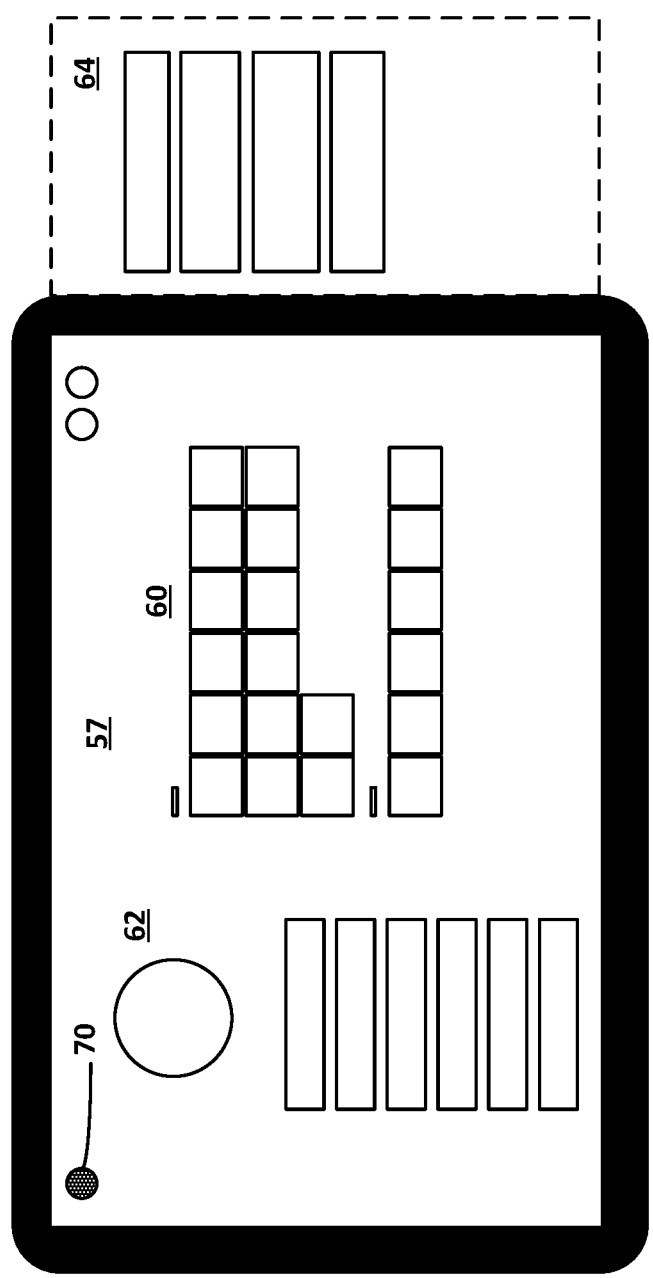
Figure 6C:
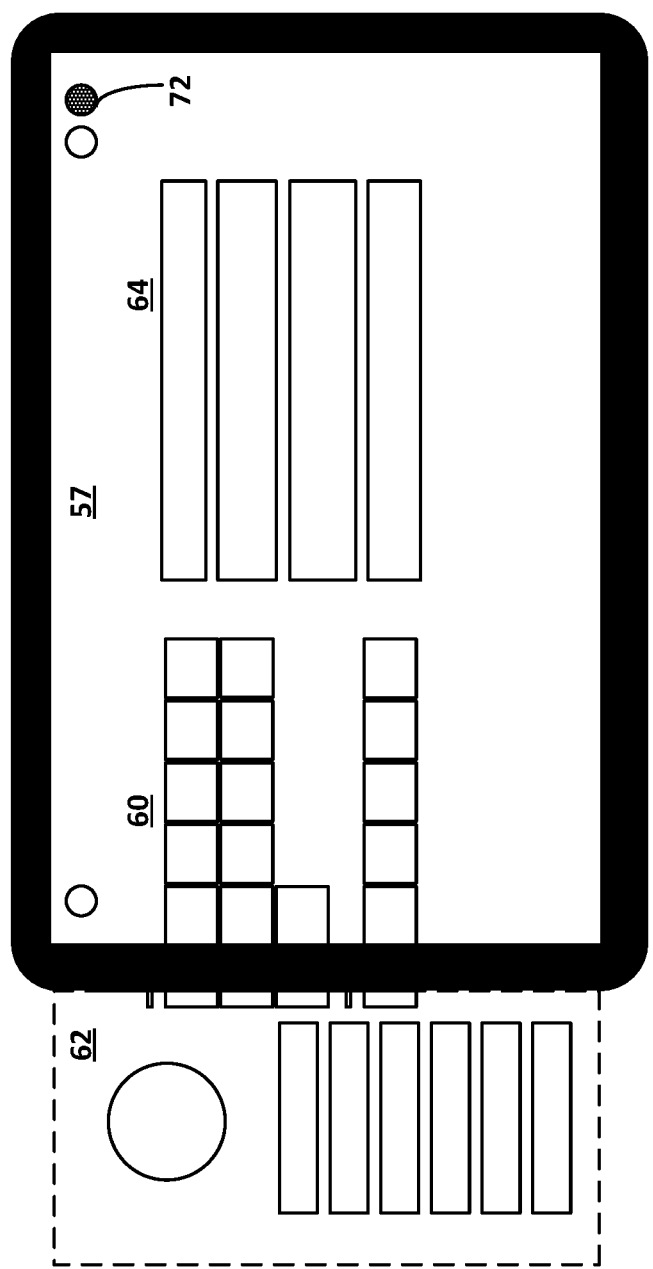

FIGS. 6A-6C show an example embodiment of switching between the main content and the supplemental content. In FIG. 6A, the ViewPort hides the supplemental content so that only the main content 60 is visible. The display may be switched to either supplemental content by triggering a corresponding icon 70 or 72. Alternatively, the user may swipe to initiate the switch by, for example, moving his finger along the touch-sensitive display in a direction opposite that of the extension area being selected. Trigger icons may display an indication of when new or unread content is available in the extension areas. For example, the icon 72 may include a counter that shows the number of unread messages, while the icon 70 may display an alert symbol in response to a determination that an option 43 requires user attention.

In FIG. 6B, the left extension area has been selected for display (e.g., by triggering the icon 70), causing the display module to move the supplemental content 62 into the ViewPort. Preferably, the supplemental content 62 is moved in such a way that the main content is not entirely replaced. Instead, at least some of the main content 62 remains visible. In FIG. 6B, the main content 60 has been displaced by shifting it to the right to make room for the supplemental content 62. Essentially all of the main content 62 remains, except the size of the main content 62 has been scaled down so that perhaps some details are no longer or not easily readable. This has an advantage of providing the user with orientation; the user knows where the supplemental content 62 exists in relation to the main content 60. Preferably, the switching uses a camera pan motion to shift content, similar to scrolling. Alternative switching mechanisms are also possible including, for example, one or more of the following: fading out the main content 60, instantaneous shifting of the main content 60, dimming the main content 60, blurring the main content 60, instantaneously shifting in the supplemental content 62, highlighting the supplemental content 62, etc.

From FIG. 6B, the user has options to switch back to the main content 60 or to the supplemental content 64. In FIG. 6C, the supplemental content 64 has been selected (e.g., by triggering corresponding icon 72), resulting in a direct switch from displaying the supplemental content 62 to displaying the supplemental content 64. As noted earlier, gesture initiated switching is also possible and may involve, for example, a single long swipe that temporarily switches the display back to the main content 60 before proceeding to the supplemental content 64 or, alternatively, two short swipes that produce the same result.

Unlike FIG. 6B, the main content 60 is shifted in FIG. 6C such that it is partially cut off by the border of the ViewPort (which may, but need not, coincide with the physical border of a display screen containing the ViewPort). The decision whether to cut off the main content may be made by the display module based on any number of considerations such as, for example, a size or an amount of the main content, a size of the ViewPort, a size or an amount of the supplemental content being shifted in, etc. For example, as shown in FIG. 6C, the elements of the supplemental content 64 are significantly wide, so that it may not be possible to display the entire main content 60 without a further reduction in size, which may be undesirable from a visual perspective.

Figure 7A:
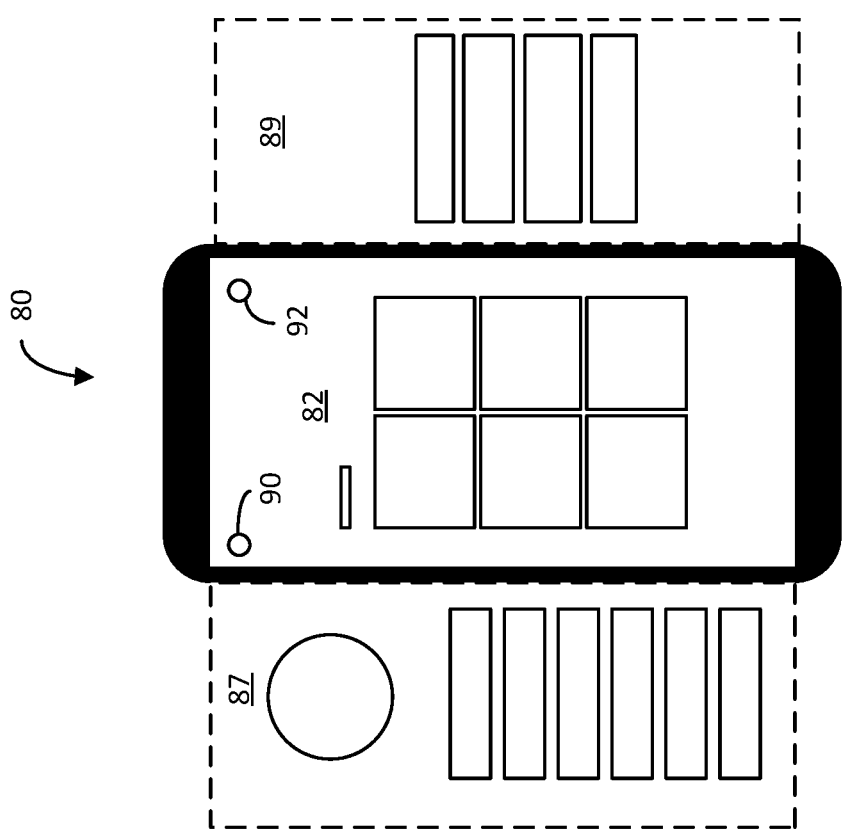
FIGS. 7A-7C show switching of content on another display device according to an example embodiment of the present disclosure.
Figure 7B:
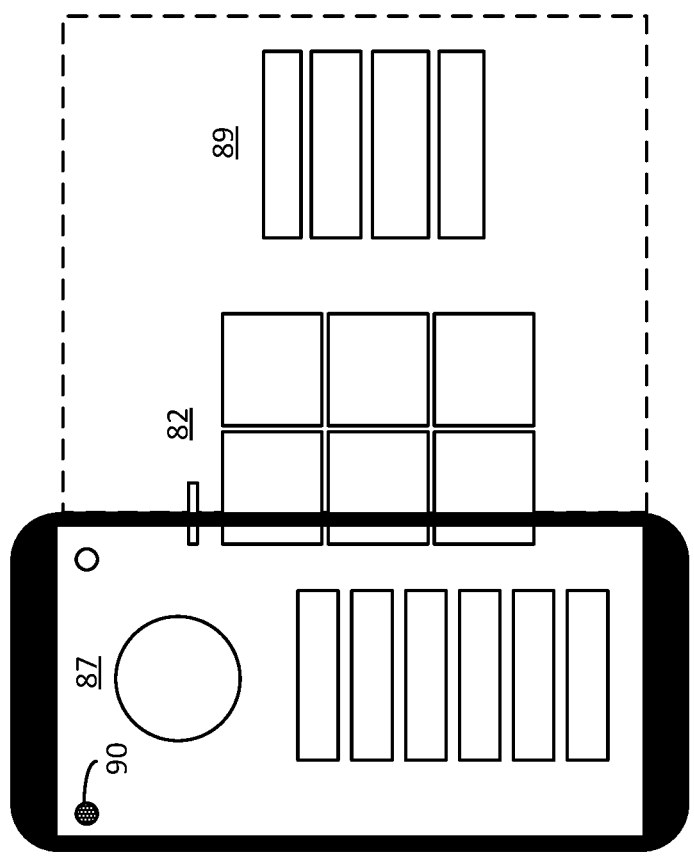
Figure 7C:
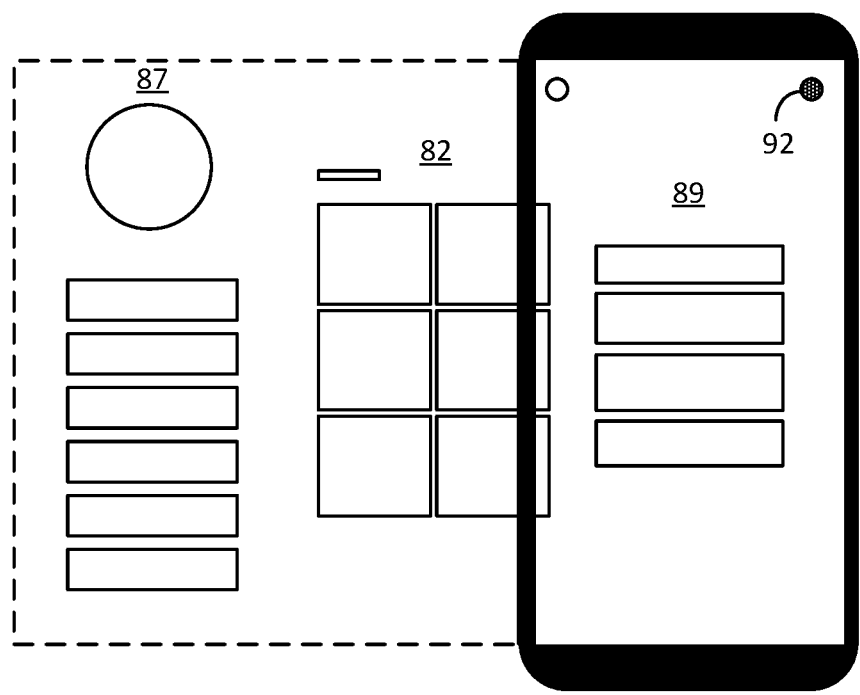

FIGS. 7A-7C show another example embodiment of switching between the main content and the supplemental content. In contrast to FIGS. 6A-6C, the display screen is smaller and narrower. The display screen may be that of a smartphone or tablet, for example. The size of the ViewPort and the extension areas may be scaled down accordingly, while retaining at least some of the same functions/information included in the supplemental content, i.e., the extension areas include a fixed set of functions/information or other user interface elements, irrespective of display screen type. In FIG. 7A, a display device 80 includes a display screen with main content 82 and trigger icons 90 and 92, which are linked to extension areas assigned to supplemental content 87 and 89, respectively. FIG. 7B shows a display state in which the supplemental content 87 is selected. FIG. 7C shows a display state in which the supplemental content 89 is selected.

Example GUIs were described in reference to display screens of various shapes and sizes. The GUIs are non-limiting examples. In fact, GUIs may be adapted based on a variety of factors. For instance, the GUI in FIG. 7A may be switched to a so-called "landscape" layout in response to a change in orientation of the display device, similar to the layout of FIG. 6A. Various properties of the GUIs may be user adjustable and/or dynamically adjusted by the display module. These properties include, but are not limited to, the size and dimensions of the ViewPort and the extension areas, panning speed, how the main and supplemental content are positioned within the ViewPort (location, orientation, positions of individual content elements, etc.), adding and moving supplemental content from the extension areas, splitting extension areas to form additional extension areas, and combining existing extension areas into a single extension area. Additional extension areas may be positioned relative to existing extension areas and/or relative to the ViewPort. In one embodiment, extension areas are placed on at least three sides of the ViewPort and navigated by panning in multiple directions (e.g., left, right, up and down).

Properties of the GUI which do not affect navigation may also be adjusted. These additional properties include, for example, background color, color palette transitions, opacity/transparency shifts, and randomization of various effects. Factors that may be considered for adjustments include, for example, time (elapsed session time, elapsed time at a particular step performed by the user, etc.); certain user actions (open, close, save, delete, etc.); device orientation; etc.

Additional elements that may be considered during dynamic GUI adjustments include various environmental factors such as ambient light (as sensed by, for example, a light detecting component on or in communication with the display device—a charge-coupled device (CCD) camera, a photodiode, a complementary metal-oxide semiconductor (CMOS) sensor, etc.).

Figure 8:
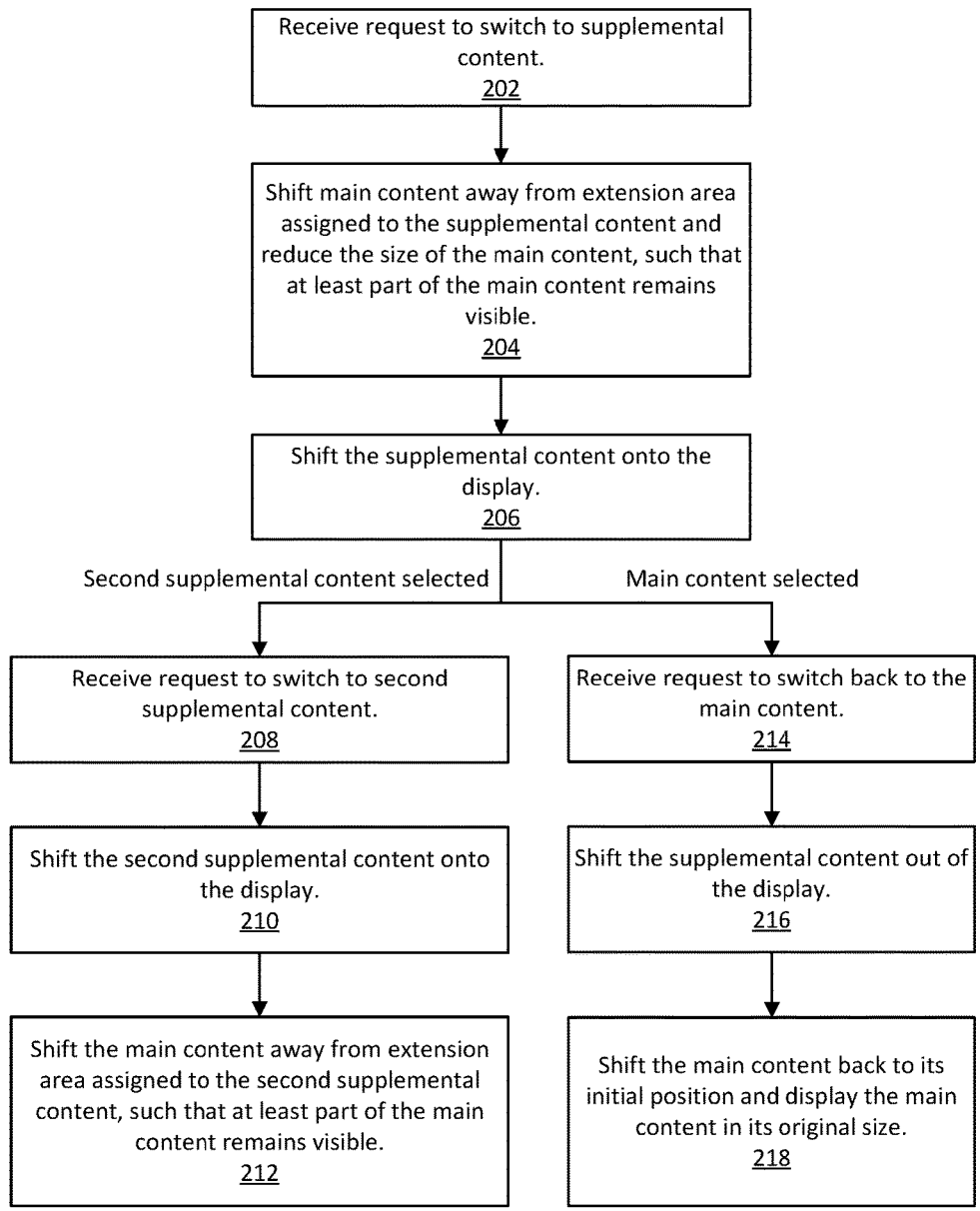
FIG. 8 is a flowchart of a method for generating a GUI according to an example embodiment of the present disclosure.

FIG. 8 shows a flowchart of a method 200 for generating a GUI including virtual extension areas according to an example embodiment of the present disclosure. The method 200 may be performed on one or more of the display devices, possibly with support for content or display functionality residing on another device such as a back-end server, a cloud computer, etc. The flowchart is an illustrative example of control logic for GUI generation. However other algorithms, logic, rules, etc. may be used to generate the GUI and/or the content for display. Thus, steps illustrated in the flowchart may be omitted and/or certain step sequences may be altered, and, in certain instances multiple illustrated steps may be simultaneously performed.

The method 200 begins with the display of main content. At step 202, the program 20 receives a request to switch to supplemental content.

At step 204, the display is switched to the selected supplemental content by shifting the main content away from the extension area assigned to the supplemental content (e.g., by panning) and reducing the size of the main content, such that at least part of the main content remains visible afterwards.

At step 206, the display module 19 shifts the supplemental content onto the display. The shifting in of the supplemental content may occur simultaneously with step 204, as part of the same panning process, for example. Once the supplemental content has been shifted in, the display may be switched to a second supplemental content or back to the main content.

At step 208, the program 20 receives a request to switch to the second supplemental content. In response, the display module 19 shifts the second supplemental content onto the display (step 210). Additionally, the main content is shifted away from the extension area assigned to the second supplemental content (i.e., towards the extension area of the first supplemental content if the first and second supplemental content are on opposite sides of the ViewPort) (step 212). Similar to step 204, at least part of the main content remains visible. The main content, having previously been reduced in size during step 204, may not be reduced further in step 212. However, appropriate size adjustments to the main content (in any dimension, up or down) are also possible depending on, for example, the amount of available space in the ViewPort for displaying the main content and the second supplemental content simultaneously.

Instead of the request to switch to the second supplemental content, the program 20 may receive a request to switch back to the main content (step 214). In response, the display module 19 shifts the supplemental content out of the display (step 216). Additionally, the main content is shifted back to its initial location in the ViewPort and restored to its original size (step 218).

An example embodiment of the present disclosure is directed to one or more processors, which can be implemented using any conventional processing circuit and device or combination thereof, e.g., a CPU of a Personal Computer (PC) or a mobile computer or other workstation processor, to execute code provided, e.g., on a non-transitory computer-readable storage medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smartphone, tablet, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present disclosure is directed to a non-transitory, hardware computer-readable medium on which are stored instructions executable by a processor to perform any one or more of the methods described herein.

An example embodiment of the present disclosure is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present disclosure may be implemented in a variety of forms, and that the various embodiments can be implemented alone or in combination. Therefore, while the embodiments of the present disclosure have been described in connection with particular examples thereof, the true scope of the embodiments and/or methods of the present disclosure should not be so limited since other modifications will become apparent to the skilled practitioner upon a study of the drawings and specification.

What is claimed is:

1. A processor implemented method for generating a graphical user interface on a display area of a display device, comprising:

determining a content area to be displayed in a display area of a device;

determining that the content area exceeds the display area;

assigning a second selection of the content area to one or more virtual extension areas, wherein the one or more virtual extension areas extend beyond the display area and are not displayed;

displaying a first selection of the content area in an initial location in the display area;

displaying a trigger button that indicates when there is unread content that was not previously displayed in the display area of the device available for display in the second selection of the content area corresponding to one of the virtual extension areas, wherein the trigger button corresponds to displaying at least a portion of the unread content from the one or more virtual extension areas; and responsive to a selection of the trigger button indicating a request to scale down an original size of the content, shifting a focus of the display area from the first selection of the content area to the second selection of the content area including the unread content and scaling down the first selection of the content area, and displaying the second selection of the content area in accordance with the selection of the trigger button, wherein the shifting comprises displaying an animated camera pan from the first selection of the content area of the second selection of the content area, wherein during the shifting: at least a first portion of the first selection of the content area remains visible, and wherein after the shifting at least a second portion of the first selection of the content area is no longer visible, and the second selection of the content area is visible.

2. The method of claim 1, wherein the first selection of the content area and the second selection of the content area are shifted simultaneously using a panning motion.

3. The method of claim 1, further comprising:
displaying, on the display area, an icon that triggers the request.

4. The method of claim 1, wherein the display area is touch-sensitive, and wherein the request is triggered by a gesture applied to the display area.

5. The method of claim 1, further comprising:
reducing a size of the first selection of the content area when the second selection of the content area is shifted onto the display area.

6. The method of claim 1, wherein the first selection of the content area is shifted such that part of the first selection of the content area is cut off by a border of the display area and a rest of the first selection of the content area remains on display.

7. The method of claim 6, wherein the shifting of the first selection of the content area is adapted to a size of the display area, such that a degree to which the first selection of the content area is cut off depends on an amount of space available for simultaneous display of the first selection of the content area and the second selection of the content area.

8. The method of claim 1, further comprising:
responsive to a request to switch back to the first selection of the content area, shifting the first selection of the content area back to the initial location on the display area together with shifting the second selection of the content area out of the display area.

9. The method of claim 8, further comprising:
reducing a size of the first selection of the content area when the second selection of the content area is shifted onto the display area; and
restoring the first selection of the content area to its original size when switching back to the first selection of the content area.

10. The method of claim 1, wherein the displaying a trigger button comprises displaying a numerical counter indicating a number of unread messages in at least one of the virtual extension areas.

11. The method of claim 10, wherein the unread messages include messages collected from a plurality of data sources including two or more of: an e-mail server, a web forum, an instant messaging service, and a website to which a user has subscribed.

12. A computer device comprising:
a display area; and
a hardware processor that is configured to generate a graphical user interface on the display area by being configured to:
determine a content area to be displayed in a display area of a device;
determine that the content area exceeds the display area;
determine a first selection of the content area in an initial location on the display area;
assign a second selection of the content area to one or more virtual extension areas, wherein the one or more virtual extension areas extend beyond the display area and are not displayed;
display the first selection of the content area in the initial location in the display area;
display a trigger button that indicates when there is unread content that was not previously displayed in the display area of the device available for display in the second selection of the content area corresponding to one of the virtual extension areas, wherein the trigger button corresponds to displaying at least a portion of the unread content from the one or more virtual extension areas; and
responsive to a selection of the trigger button indicating a request to scale down an original size of the content, shifting a focus of the display area from the first selection of the content area to the second selection of the content area including the unread content and scaling down the first selection of the content area, and displaying the second selection of the content area in accordance with the selection of the trigger button, wherein the shifting comprises displaying an animated camera pan from the first selection of the content area of the second selection of the content area, wherein during the shifting: at least a first portion of the first selection of the content area remains visible, and wherein after the shifting at least a second portion of the first selection of the content area is no longer visible, and the second selection of the content area is visible.

13. The computer device of claim 12, wherein the first selection of the content area and the second selection of the content area are shifted simultaneously using a panning motion.

14. The computer device of claim 12, wherein the processor is configured to reduce a size of the first selection of the content area when the second selection of the content area is shifted onto the display area.

15. The computer device of claim 12, wherein the first selection of the content area is shifted such that part of the first selection of the content area is cut off by a border of the display area and a rest of the first selection of the content area remains on display.

16. The computer device of claim 15, wherein the processor is configured to adapt the shifting of the first selection of the content area to a size of the display area, such that a degree to which the first selection of the content area is cut off depends on an amount of space available for simultaneous display of the first selection of the content area and the second selection of the content area.

17. The computer device of claim 12, wherein responsive to a request to switch back to the first selection of the content area, the processor is configured to shift the first selection of the content area back to the initial location on the display area together with shifting the second selection of the content area out of the display area.

18. The computer device of claim 17, wherein the processor is configured to:
   reduce a size of the first selection of the content area when the second selection of the content area is shifted onto the display area; and
   restore the main content to its original size when switching back to the first selection of the content area.

19. A system, comprising:
   a memory; and
   at least one processor coupled to the memory and configured to:
   determine a content area to be displayed in a display area of a device;
   determine that the content area exceeds the display area;
   assign a second selection of the content area to one or more virtual extension areas, wherein the one or more virtual extension areas extend beyond the display area and are not displayed;
   displaying a first selection of the content area in an initial location in the display area;
   display a trigger button that indicates when there is unread content that was not previously displayed in the display area of the device available for display in the second selection of the content area corresponding to one of the virtual extension areas, wherein the trigger button corresponds to displaying at least a portion of the unread content from the one or more virtual extension areas; and
   responsive to a selection of the trigger button indicating a request to scale down an original size of the content, shifting a focus of the display area from the first selection of the content area to the second selection of the content area including the unread content and scaling down the first selection of the content area, and displaying the second selection of the content area in accordance with the selection of the trigger button, wherein the shifting comprises displaying an animated camera pan from the first selection of the content area of the second selection of the content area, wherein during the shifting: at least a first portion of the first selection of the content area remains visible, and wherein after the shifting at least a second portion of the first selection of the content area is no longer visible, and the second selection of the content area is visible.

* * * * *